United States Patent
Lin

(10) Patent No.: US 6,595,032 B2
(45) Date of Patent: Jul. 22, 2003

(54) LOCK CYLINDER-FREE LOCK DEVICE

(76) Inventor: Wen-Chen Lin, 4/F-1, No. 124, Yungfu Rd., Hsitun Dist., Taichung City (TW)

( * ) Notice: Subject to any disclaimer, the term of this patent is extended or adjusted under 35 U.S.C. 154(b) by 65 days.

(21) Appl. No.: 09/985,105

(22) Filed: Nov. 1, 2001

(65) Prior Publication Data

US 2003/0079510 A1 May 1, 2003

(51) Int. Cl.[7] .............................................. E05B 21/00
(52) U.S. Cl. ............................. 70/352; 70/387; 70/134
(58) Field of Search ........................... 70/134, 350–352, 70/387, 409

(56) References Cited

U.S. PATENT DOCUMENTS

| | | | | |
|---|---|---|---|---|
| 55,460 A | * | 6/1866 | Brouse | 70/352 |
| 179,912 A | * | 7/1876 | Guild | 70/352 |
| 690,191 A | * | 12/1901 | Saxe | 70/352 |
| 1,134,141 A | * | 4/1915 | Kosinsky | 70/352 |
| 1,366,161 A | * | 1/1921 | Clark | 70/352 |
| 1,390,222 A | * | 9/1921 | Wise | 70/387 X |
| 1,526,515 A | * | 2/1925 | Vives | 70/32 |
| 1,527,336 A | * | 2/1925 | Voda | 70/387 X |
| 1,551,205 A | * | 8/1925 | Nagy | 70/352 |
| 1,597,560 A | * | 8/1926 | Wise | 70/387 X |
| 1,719,309 A | * | 7/1929 | Radosevic | 70/387 |
| 3,204,437 A | * | 9/1965 | Dreyfus | 70/350 |
| 3,681,953 A | * | 8/1972 | Luttrall | 70/352 X |
| 3,780,548 A | * | 12/1973 | Anastasov | 70/352 |
| 4,388,815 A | * | 6/1983 | Lawler | 70/134 |
| 4,461,161 A | * | 7/1984 | Shpigelman | 70/352 |
| 4,838,058 A | * | 6/1989 | Matsumoto | 70/355 |
| 4,860,562 A | * | 8/1989 | Koren et al. | 70/352 |
| 5,024,071 A | * | 6/1991 | Shafirkin | 70/387 |
| 5,343,724 A | * | 9/1994 | Sornes | 70/352 X |
| 5,606,881 A | * | 3/1997 | Drake | 70/352 |

* cited by examiner

Primary Examiner—Suzanne Dino Barrett
(74) Attorney, Agent, or Firm—Rosenberg, Klein & Lee

(57) ABSTRACT

A lock cylinder-free lock device is constructed to include a casing, a locating block fixedly covered on a top side of the casing, the locating block having a plurality of vertical pinholes, a locking block moved in the casing between the locking position and the unlocking position, the locking block having spring-supported pins respectively extended out of a stepped top sidewall thereof and adapted for engaging into the pinholes of the locating block when the locking block moved to the locking position, and a key adapted for unlocking the locking block, the key having bottom pins of different lengths adapted for inserting into the pinholes of the locating block to disengage the spring-supported pins the locating block.

7 Claims, 11 Drawing Sheets

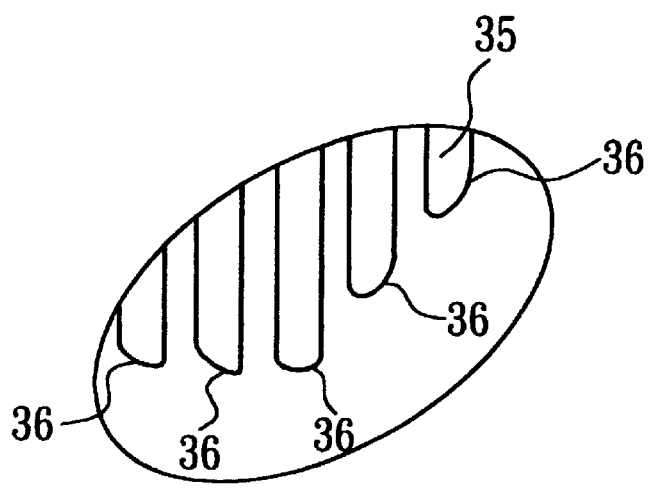
FIG.5B
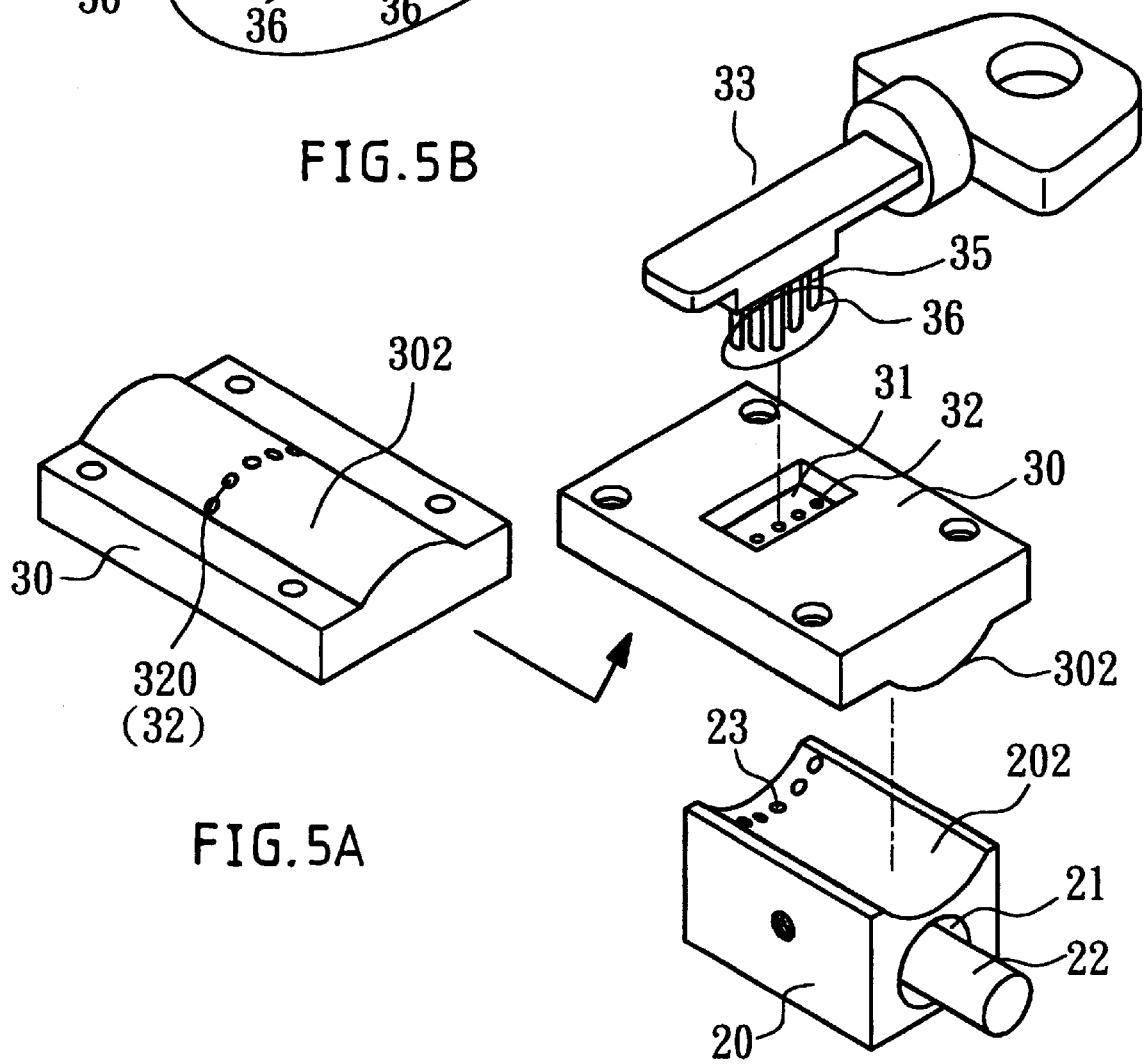
FIG.5A
FIG.5

LOCK CYLINDER-FREE LOCK DEVICE

BACKGROUND OF THE INVENTION

The present invention relates to locks, and more particularly, to a lock cylinder-free lock device, which achieves high security subject to "accurate depth".

A regular lock device is known comprising a lock body, a latch bolt, a lock cylinder rotated with the key to move the latch bolt in and out of the lock body between the locking position and the unlocking position. This structure of lock device has drawbacks. A thief can easily unlock the lock device by inserting a wire rod into the keyway of the lock cylinder to move the moving elements in the lock cylinder into the accurate unlocking position. Further, because the structure of the lock cylinder is complicated, it needs special techniques to assemble the lock cylinder and to install the lock cylinder in the lock body.

SUMMARY OF THE INVENTION

The present invention has been accomplished to provide a lock device, which eliminates the aforesaid drawbacks. It is one object of the present invention to provide a lock cylinder-free lock device, which eliminates the use of a complicated lock cylinder. It is another object of the present invention to provide a lock cylinder-free lock device, which achieves high security. It is still another object of the present invention to provide a lock cylinder-free lock device, which is inexpensive to manufacture and, easy to install. According to one aspect of the present invention, the lock cylinder-free lock device comprises a casing, a locating block fixedly covered on a top side of the casing, the locating block having a plurality of vertical pinholes, a locking block moved in the casing between the locking position and the unlocking position, the locking block having spring-supported pins respectively extended out of a stepped top sidewall thereof and adapted for engaging into the pinholes of the locating block when the locking block moved to the locking position, and a key adapted for unlocking the locking block, the key having bottom pins of different lengths adapted for inserting into the pinholes of the locating block to disengage the spring-supported pins the locating block. According to another aspect of the present invention, the pinholes of the locating block each have an expanded bottom section of diameter smaller than the top end of each of the stepped through holes of the locking block. This design prevents the thief from detecting the accurate insertion depth of inserting a rod member in each pinhole of the locating block to disengage the corresponding spring-supported headed pin from the locating block without engaging into the corresponding stepped through hole in the locking block.

BRIEF DESCRIPTION OF THE DRAWINGS

FIG. 5 is an exploded view of a lock device according to a second embodiment of the present invention.

FIG. 5A is a bottom view of the locating block shown in FIG. 5.

FIG. 5B is an enlarged view of the part (b) of FIG. 5.

DETAILED DESCRIPTION OF THE PREFERRED EMBODIMENT

Figures 1, 1A:
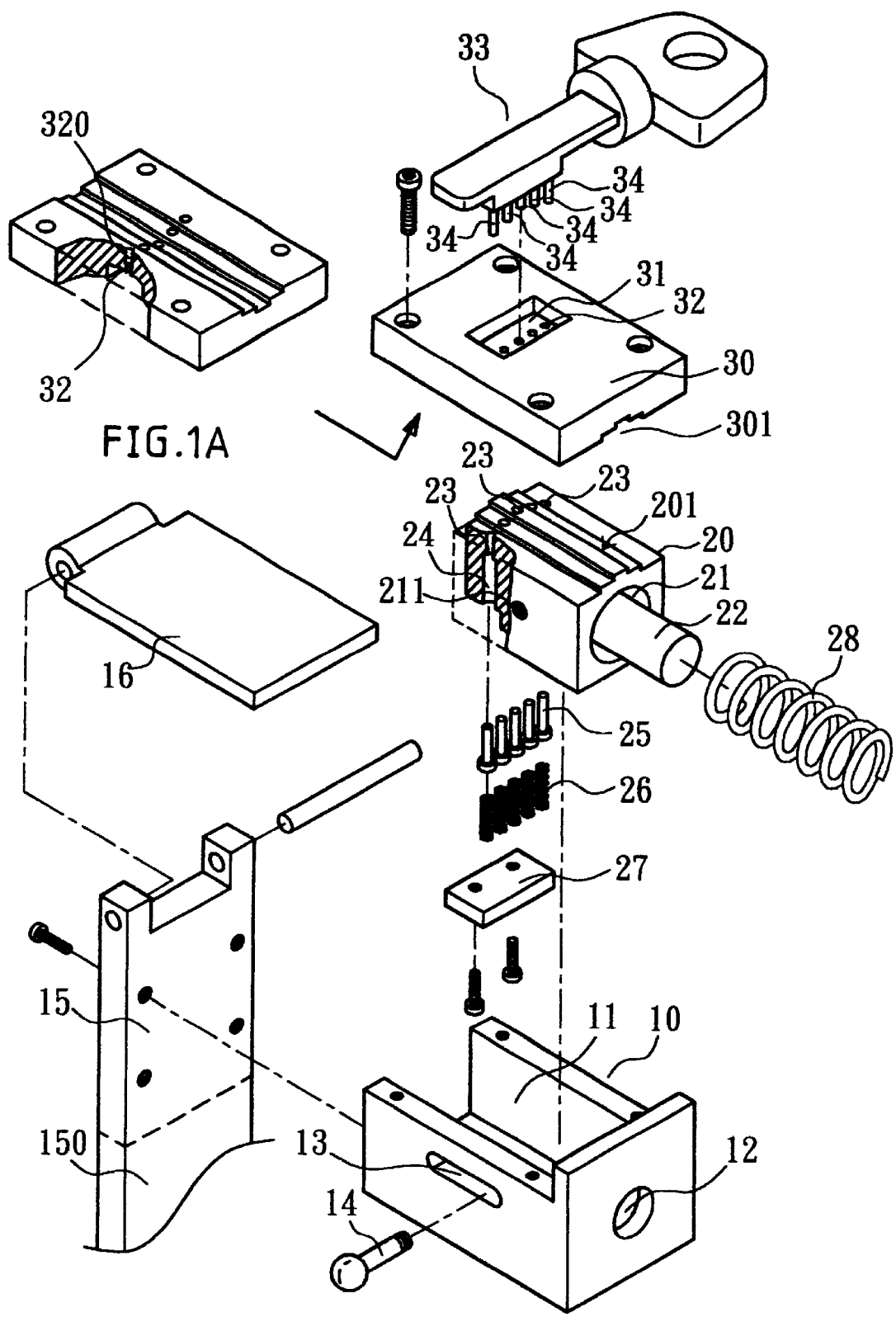
FIG. 1 is an exploded view of a lock cylinder-free lock device according to a first embodiment of the present invention.
FIG. 1A is a bottom view, partially cutaway, of the locating block according to the first embodiment of the present invention.
Figure 2:
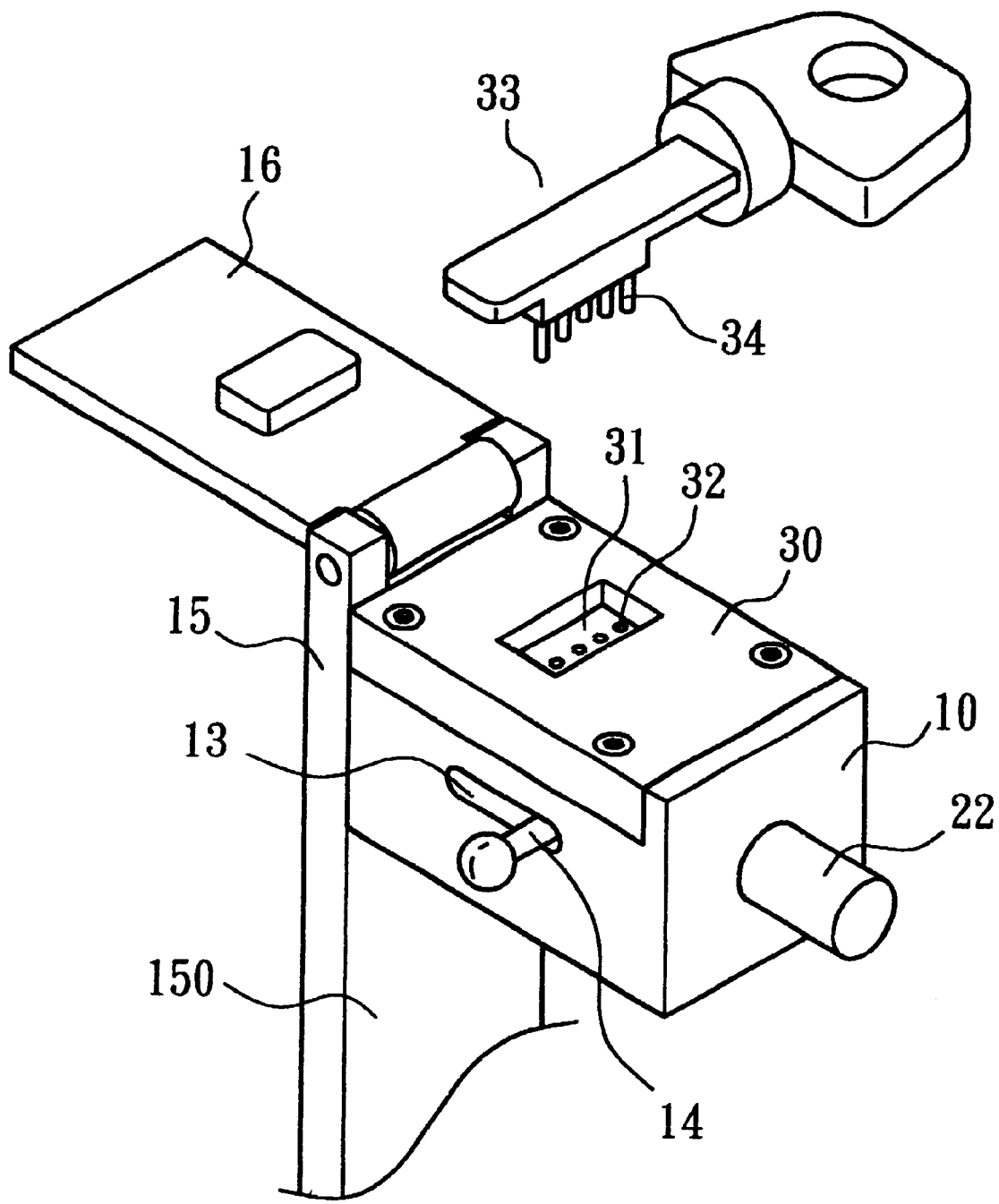
FIG. 2 is an assembly view of the lock cylinder-free lock device shown according to the first embodiment of the present invention before the insertion of the key into the pinholes of the locating block.

Referring to FIGS. from 1 through 4, a lock cylinder-free lock device in accordance with the present invention is shown comprised of a casing 10, a locking block 20, a locating block 30, and a key 33.

The casing 10 comprises a receiving chamber 11, which receives the locking block 20, a front through hole 12 in the front sidewall thereof, a sliding slot 13 longitudinally extended in one lateral sidewall thereof, a rear mounting plate 15 fixedly fastened to the rear side thereof, and a guard plate 16 hinged to the top side of the rear mounting plate 15 and adapted for covering the locating block 30 after installation of the locating block 30 in the top side of the casing 10. The rear mounting plate 15 has a bottom extension 150 for fastening to, for example, a part of the chassis of a car for enabling the lock device to lock the shifter lever.

The locking block 20 is longitudinally slidably mounted in the receiving chamber 11 of the casing 10 comprising a transverse row of vertically extended stepped through holes 23;24 near the rear side, each stepped through hole including a lower part 24 of relatively greater diameter and an upper part 23 of relatively smaller diameter, a plurality of springs 26 respectively mounted in the lower part 24 of each of the stepped through holes 23;24, a plurality of headed pins 25 respectively supported on the springs 26 in the lower part 24 of each of the stepped through holes 23;24 and respectively inserted through the upper part 23 of each of the stepped through holes 23;24 over the stepped top sidewall thereof, a packing plate 27 fastened to the bottom sidewall thereof to hold the springs 26 and the headed pins 25 in the stepped through holes 23;24, a fixed bolt 22 forwardly extended from the front side thereof, an annular groove 21 disposed in the front sidewall around the fixed bolt 22, a side screw hole 211 in one lateral sidewall thereof, and a compression spring 28 sleeved onto the fixed bolt 22. The compression spring 28 has one end positioned in the annular groove 21 of the locking block 20, and the other end stopped against the front sidewall of the casing 10. Further, a threaded finger rod 14 is inserted through the sliding slot 13 of the casing 10 and threaded into the side screw hole 211 of the locking block 20.

The locating block 30 is fixedly fastened to the top side of the casing 10 to hold the locking block 20 inside the casing 10, comprising a longitudinally grooved bottom sidewall 301 matching the stepped top sidewall 201 of the locking block 20, a top recess 31, and a plurality of pinholes 32 vertically extended through the top recess 31 in alignment with the stepped through holes 23;24 of the locking block 20. The pinholes 32 each have an expanded bottom section 320.

The key 33 has a plurality of bottom pins 34 adapted for inserting into the pinholes 32 of the locating block 30 to force the headed pins 25 backwardly away from the pinholes 32 of the locating block 30 against the respective springs 26. The bottom pins 34 have different lengths determined subject to the configuration of the stepped top sidewall 201 of the locking block 20, i.e., the bottom pins 34 force the headed pins 25 back to the inside of the stepped through holes 23;24 of the locking block 20 respectively without entering the stepped through holes 23;24 of the locking block 20 when inserted into the pinholes 32 of the locating block 30.

Figure 3A:
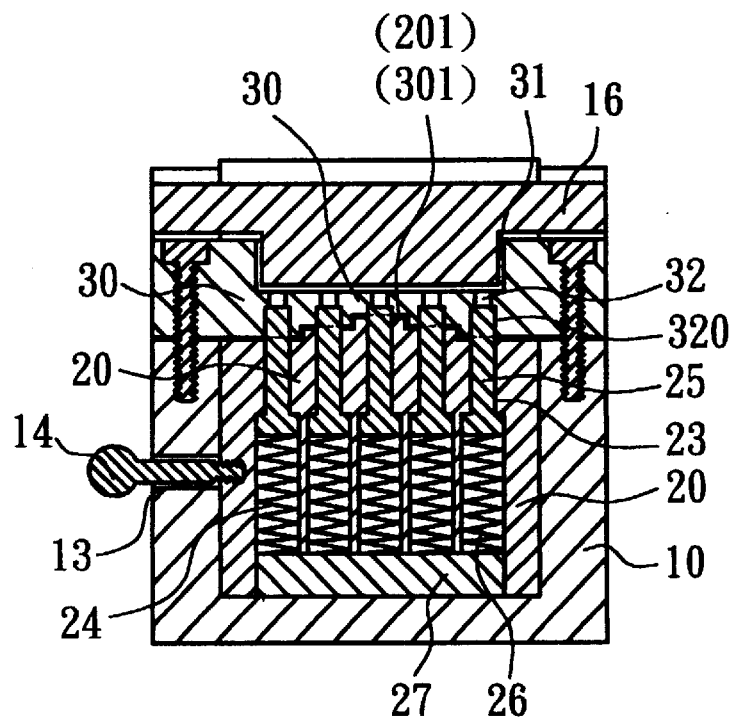
FIG. 3A is a side view in section of the lock cylinder-free lock device according to the first embodiment of the present invention (the key excluded).
Figure 3B:
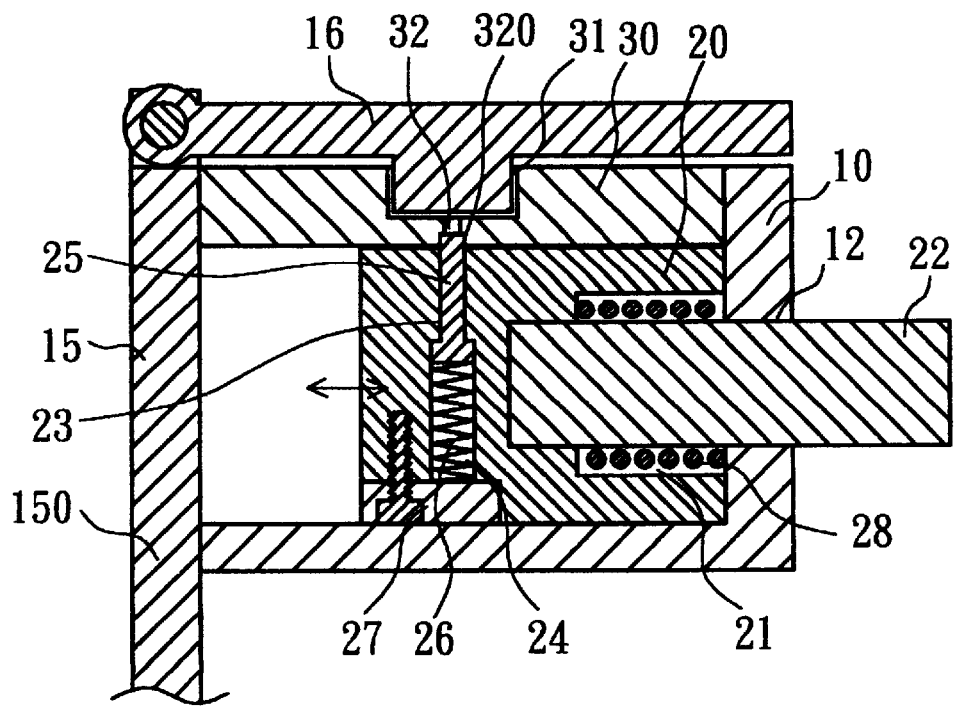
FIG. 3B is a front view in section of the lock cylinder-free lock device according to the first embodiment of the present invention (the key excluded).
Figure 4A:
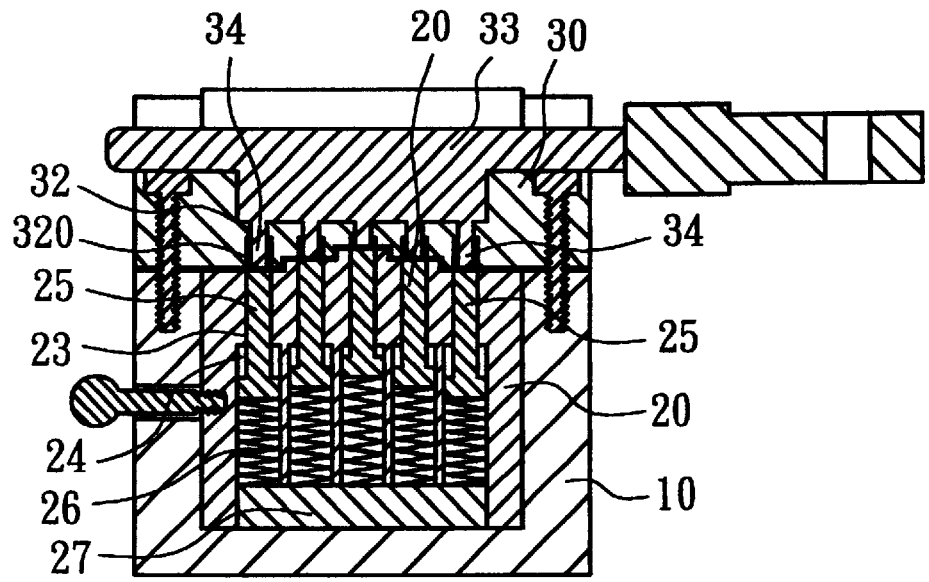
FIG. 4A is a side view in section of the lock device according to the first embodiment of the present invention when unlocked with the key.
Figure 4B:
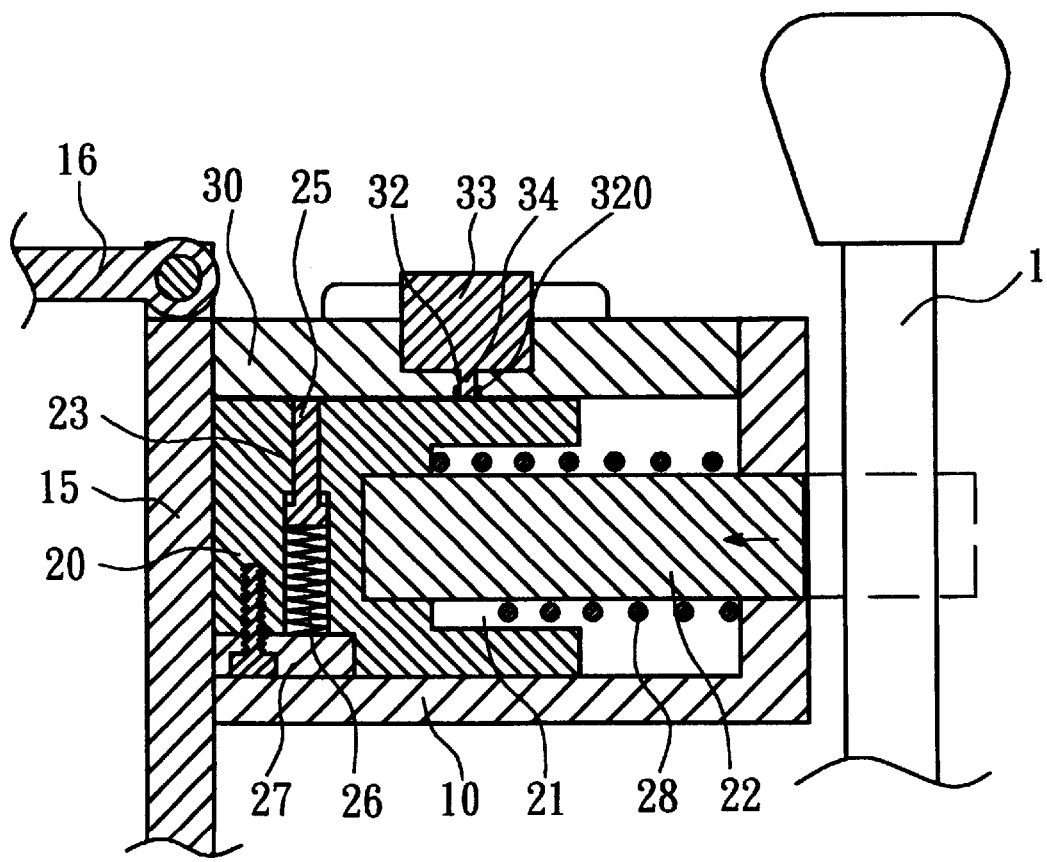
FIG. 4B is a front view in section of the lock cylinder-free lock device according to the first embodiment of the present invention when unlocked.
Figure 6A:
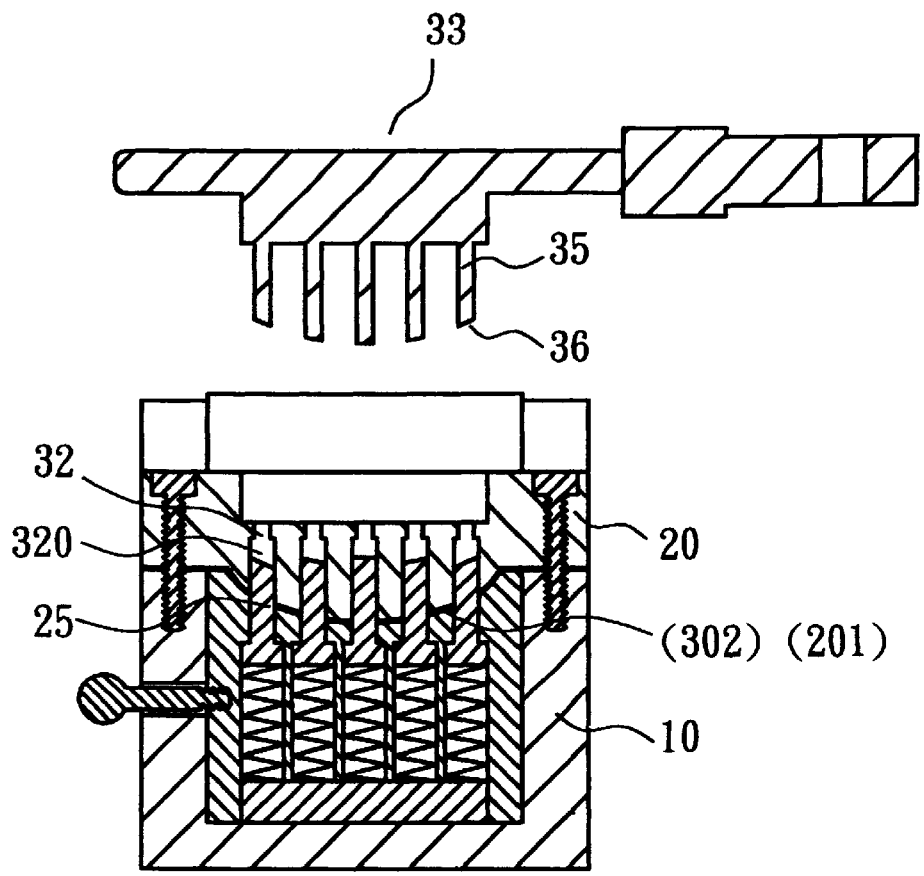
FIG. 6A is a sectional assembly view of the second embodiment of the present invention when locked.
Figure 6B:
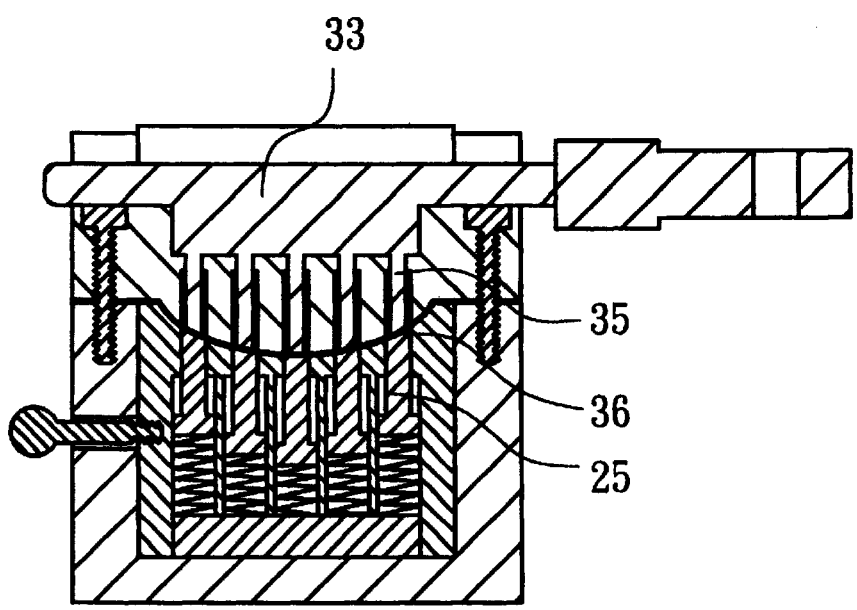
FIG. 6B is a sectional view of the second embodiment of the present invention when unlocked.

Referring to FIGS. 3 and 4, when locking, the locking block 20 is moved forwards to compress the compression spring 28 and to force the fixed bolt 22 out of the casing 10 through the front through hole 12. At this time, the stepped through holes 23;24 of the locking block 20 are respectively moved into alignment with the pinholes 32 of the locating block 30, and the springs 26 force the headed pins 25 upwardly out of the stepped through holes 23;24 of the locking block 20 into the pinholes 32 of the locating block 30 to lock the locking block 20 (see FIGS. 3A and 3B). When used to lock the shifter lever 1 (see also FIG. 4B), the shifter lever 1 is prohibited from shifting.

When unlocking the lock device, insert the bottom pins 34 into the pinholes 32 of the locating block 30 to force the headed pins 25 back to the inside of the stepped through holes 23;24 of the locking block 20. When the headed pins 25 disengaged from the pinholes 32 of the locating plate 30, the compression spring 28 immediately forces the locking block 20 backwards, thereby causing the fixed bolt 22 to be moved with the locking block 20 backwards to the inside of the front through hole 12 of the casing 10, and therefore the lock device is unlocked (See FIGS. 4A and 4B).

Figure 7A:
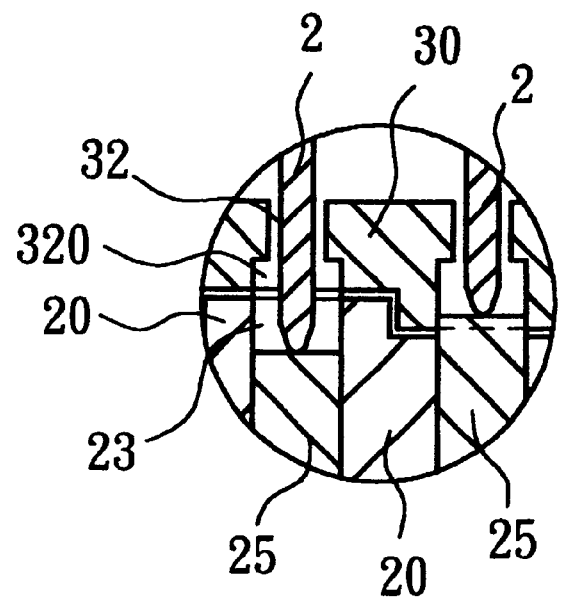
FIG. 7A is an enlarged view of a part of FIG. 7.
Figure 7:
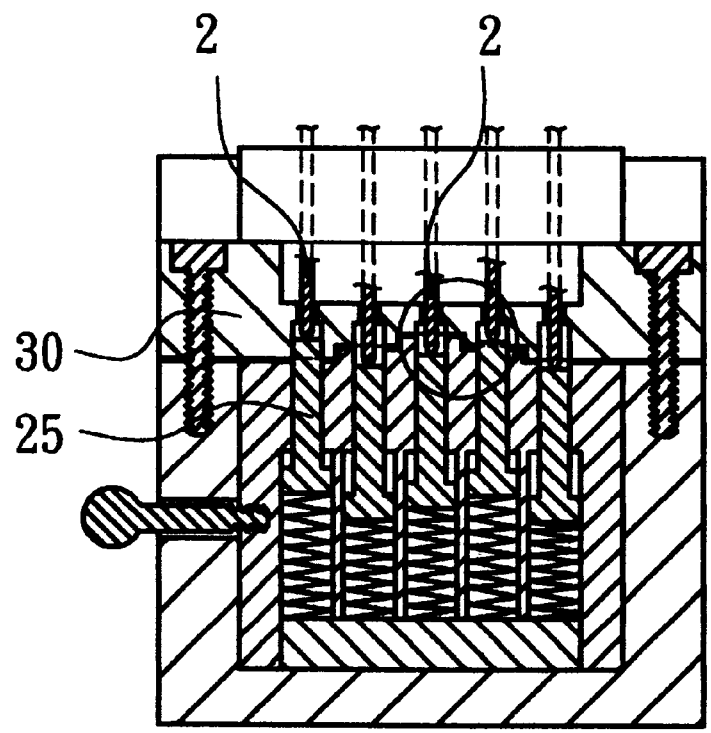
FIG. 7 is a sectional view explaining the invalid effect of the insertion of rod members into the pinholes of the locating block of the lock device constructed according to the first embodiment of the present invention.

Referring to FIGS. 7 and 7A, when a thief trying rod members 2 to unlock the lock device, the thief cannot open the lock device. Simply inserting rod members 2 into the pinholes 32 of the locating block 30 to force the headed pins 25 downwardly away from the pinholes 32 cannot unlock the locking block 20 because of the following reasons:

(1) When inserting a rod member 2 into one pinhole 32 of the locating block 30 to disengage the corresponding headed pin 25 from the corresponding pinhole 32, the rod member 2 may be engaged into the upper part 23 of the corresponding stepped through holes 23;24, stopping the locking block 20 from backward movement, i.e., it is difficult to insert the rod member 2 into the pinhole 32 to force the corresponding headed pin 25 away from the locating block 30 without engaging into the corresponding stepped through hole 23;24.

(2) Because the locking block 20 is provided with multiple headed pins 25 adapted for engaging into multiple pinholes 32 in the locating block 30, it is almost impossible to insert multiple rod members 2 respectively into the pinholes 32 of the locating block 30 to force the headed pins 25 away from the locating block 30 without engaging into the corresponding stepped through hole 23;24.

(3) Because the pinholes 32 each have an expanded bottom section 320 and because the diameter of the upper part 23 of each stepped through hole 23;24 is greater than the expanded bottom section 320 of each of the pinholes 32, the thief cannot detect the accurate depth in which the rod member 2 should be inserted.

(4) Because the stepped through holes 23;24 (the headed pins 25) are closely arranged in parallel and because each headed pin 25 has a smaller diameter, there is no space for enabling the thief to try rod members 2 to move the headed pins 25 accurately to the unlocking position.

Further, a thief may use a hammer or the like to force back the bolt or to damage the bolt. This method is effective to regular padlocks. When hammering the U-shaped shackle of a padlock with a hammer or the like, the U-shaped shackle can easily be disengaged from the latch. The invention eliminates this problem because of the following reasons:

(1) Because the fixed bolt 22 is integral with the locking block 20, it is difficult to strike the fixed bolt 22 away from the locking block 20.

(2) Because multiple headed pins 25 are mounted in the locking block 20 and inserted into the locating block 30 when the lock device locked, it is difficult to force the locking block 20 backwards relative to the locating block 30 with hand tool.

(3) When the rear mounting plate 15 and the locating block 30 fastened to the casing 10 by screws, the connection areas can be sealed by welding, preventing the insertion of a pry or the like into the inside of the casing 10 to damage the parts of the lock device.

Figure 8A:
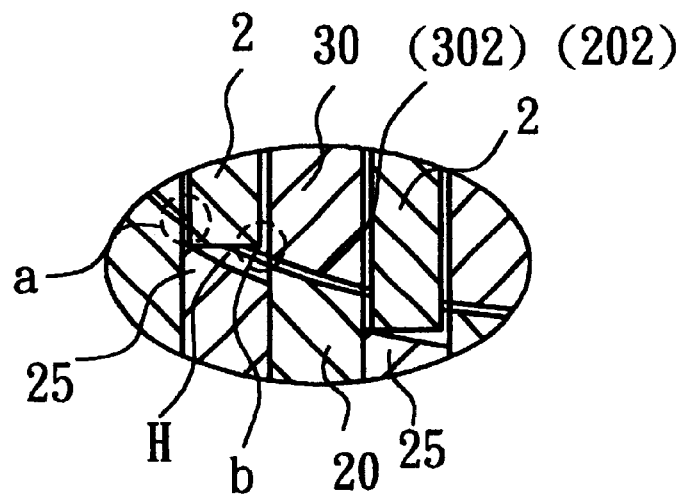
FIG. 8A is an enlarged view of a part of FIG. 8.
Figure 8:
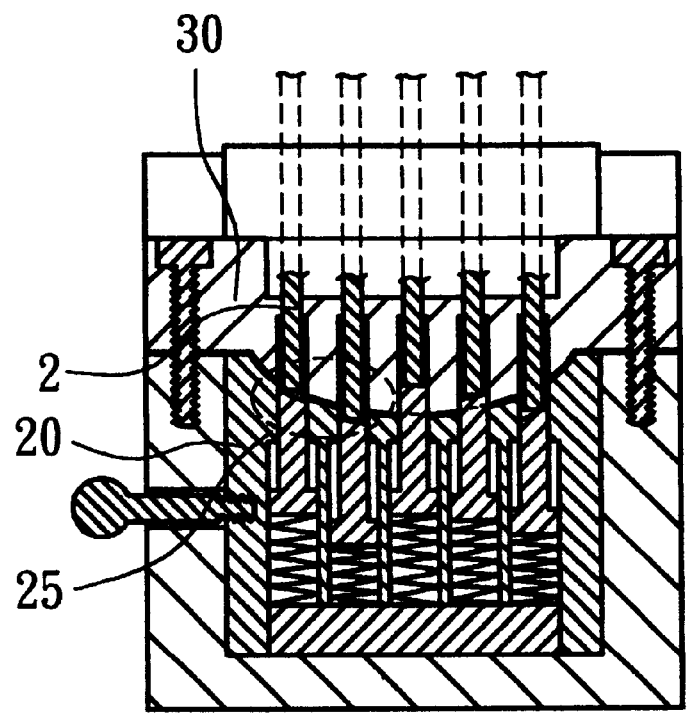
FIG. 8 a sectional view explaining the invalid effect of the insertion of rod members into the pinholes of the locating block of the lock device constructed according to the second embodiment of the present invention.
Figures 9, 9A:
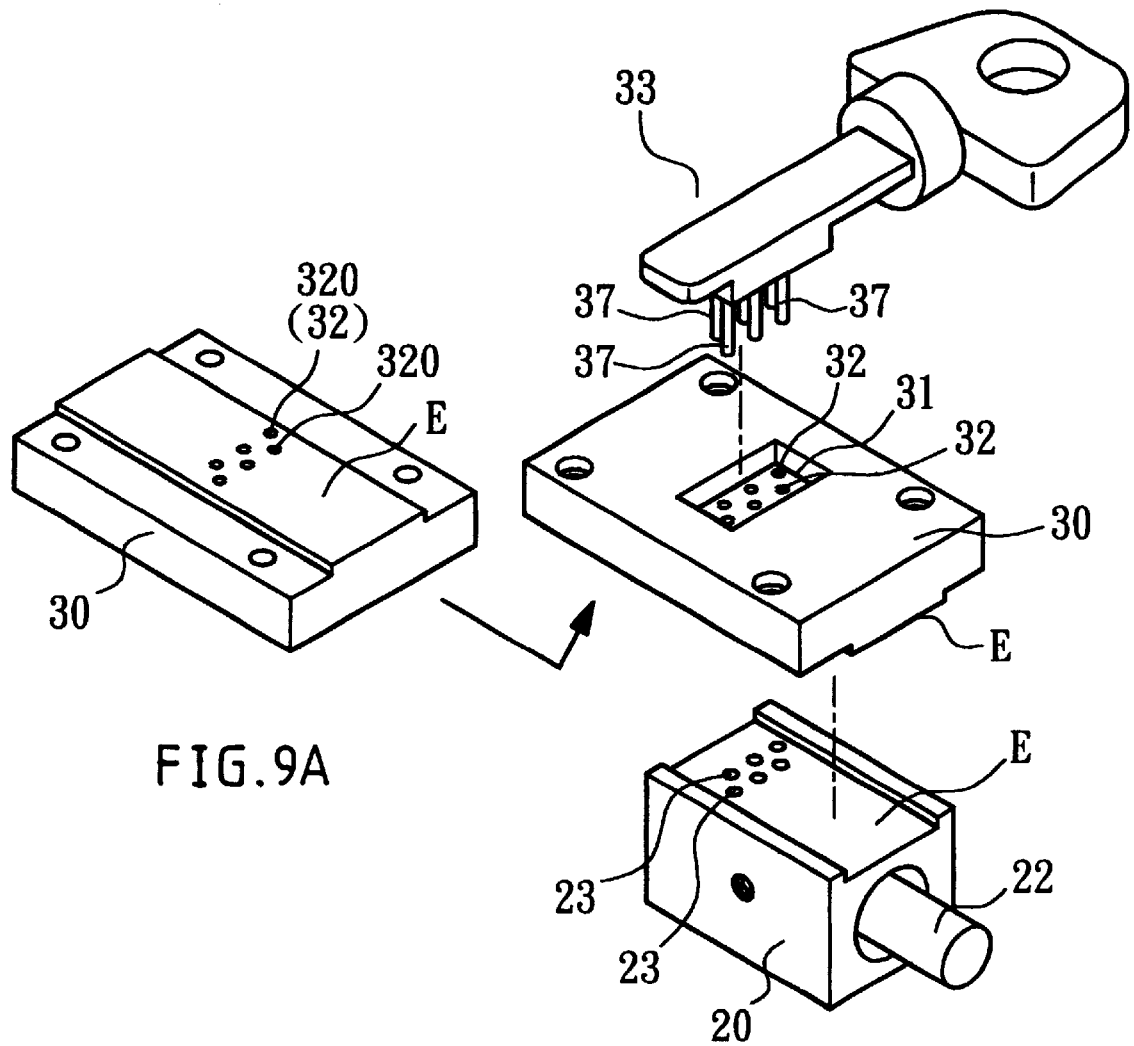
FIG. 9 is an exploded view of a lock cylinder-free lock device according to a third embodiment of the present invention.
FIG. 9A is a bottom view of the locating block shown in FIG. 9.
Figure 10A:
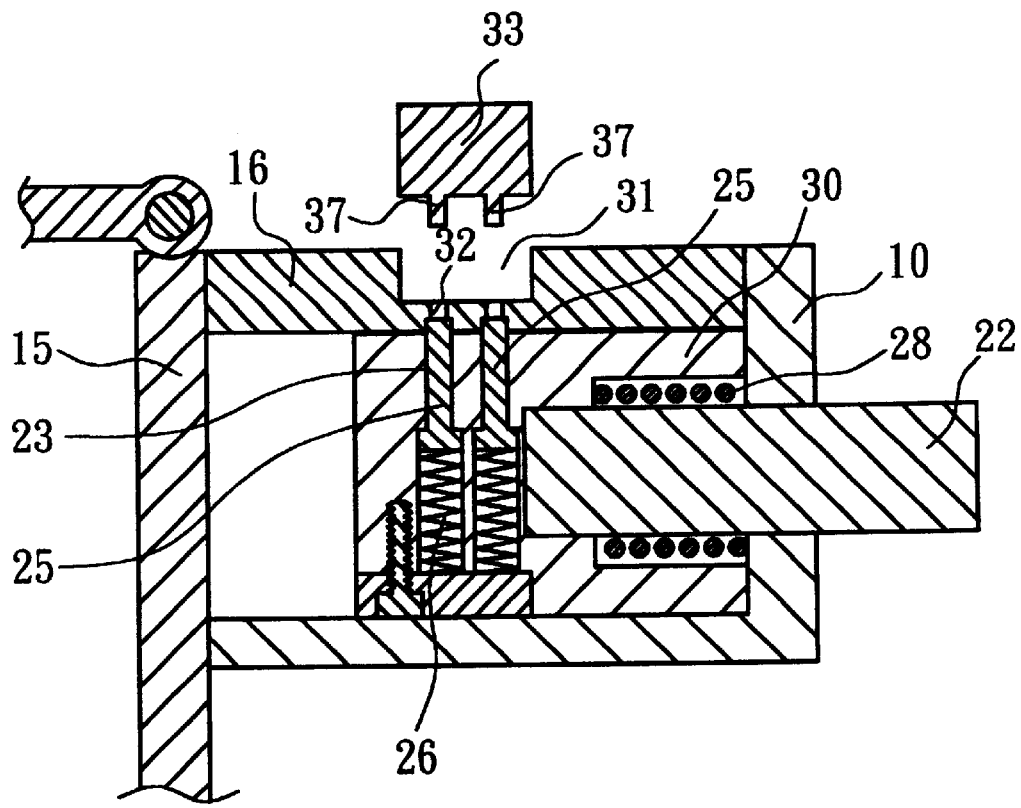
FIG. 10A is a sectional assembly view of the third embodiment of the present invention when locked.
Figure 10B:
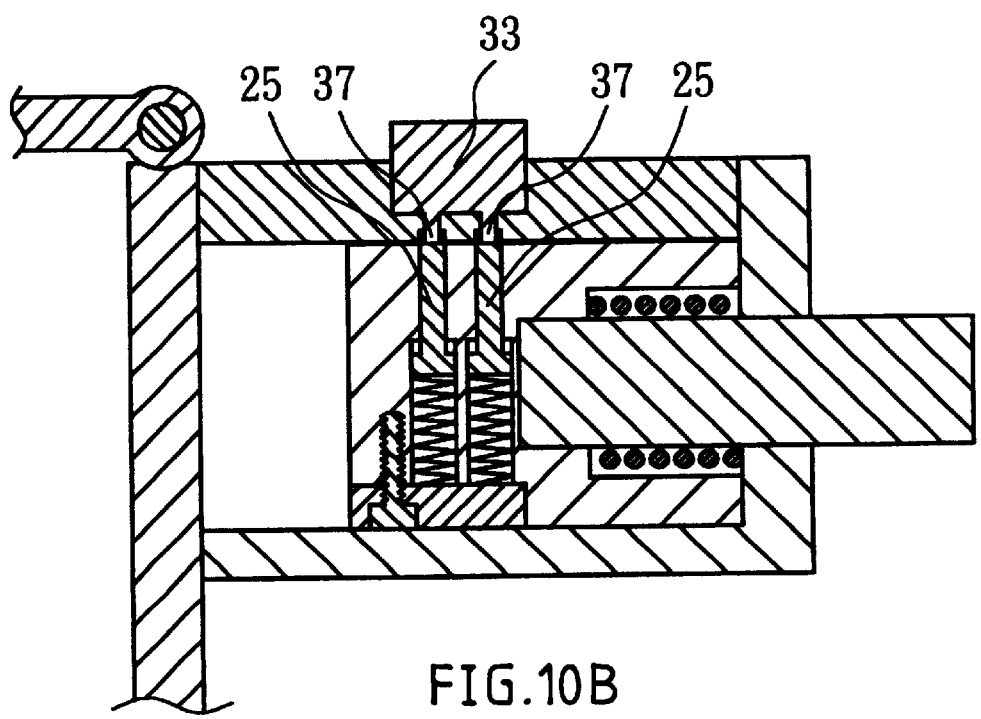
FIG. 10B is a sectional view of the third embodiment of the present invention when unlocked.

FIGS. 5, 5A, 5B, 6A, and 6B show an alternate form of the lock device according to the present invention. According to this embodiment, the locking block 20 has a top sidewall 202 curved inwards, and the locating block 30 has a bottom sidewall 302 curved outwards and fitting the inwardly curved top sidewall 202 of the locking block 20. Further, the bottom pins 35 of the key 33 have a respective curved bottom edge 36 fitting the curvature of the inwardly curved top sidewall 202 of the locking block 20. This embodiment achieves same burglar-protection effect as described in the aforesaid embodiment. As shown in FIGS. 8 and 8A, when inserted rod members 2 into the locating block 30 to force the headed pins 25 backwardly away from the locating block 30 into the inside of the locking block 20, the right angles a and b of the flat bottom end H of each inserted rod member 2 stop the locking block 20 in position, prohibiting the locking block 20 from moving to the unlocking position.

FIGS. 9, 9A, 10A, and 10B show another alternate form of the lock device according to the present invention. According to this embodiment, the locking block 20 and the locating block 30 are coupled together by a tongue-and-groove joint E (the locking block 20 has a longitudinally extended top groove and the locating block 30 has a longitudinally extended bottom tongue fitting the top groove of the locking block 20), the locking block 20 has two transverse rows of vertically extended stepped through holes 23, and the locating block 30 has two transverse rows of vertically extended pinholes 32 corresponding to the through holes 23 of the locking block 20.

Figure 11:
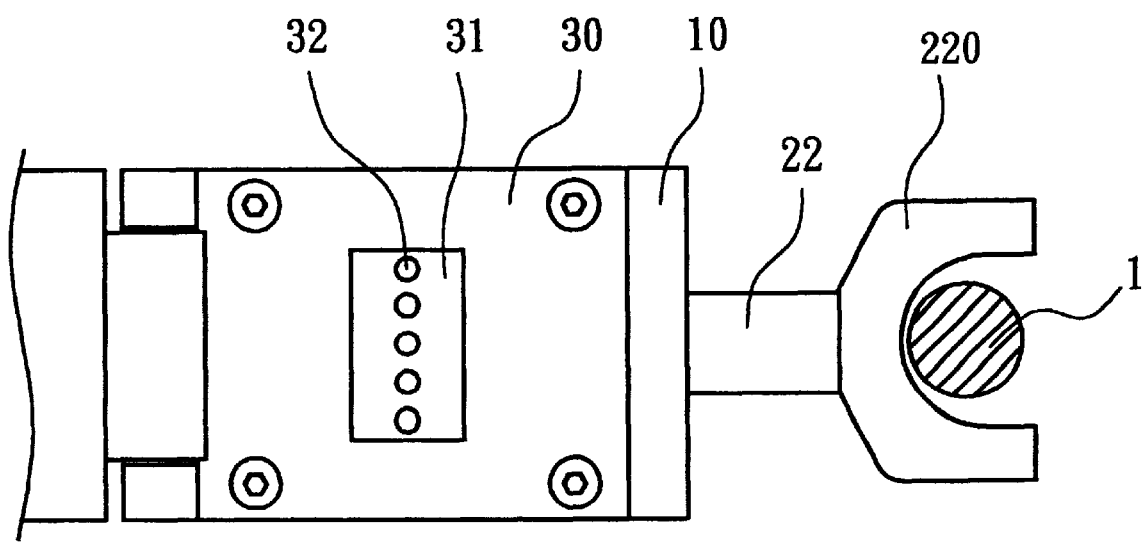
FIG. 11 is a top plain view of a lock cylinder-free lock device according to a fourth embodiment of the present invention.

FIG. 11 shows still another alternate form of the present invention. According to this embodiment, the fixed bolt 22 has an outer end terminating in a U-shaped fork 220 adapted for holding down the shifter lever 1.

A prototype of lock device has been constructed with the features of FIGS. 1~11. The lock device functions smoothly to provide all of the features discussed earlier.

Although particular embodiments of the invention have been described in detail for purposes of illustration, various modifications and enhancements may be made without departing from the spirit and scope of the invention. Accordingly, the invention is not to be limited except as by the appended claims.

What the invention claimed is:

1. A lock cylinder-free lock device comprising:

a casing, said casing comprising a receiving chamber, a front through hole in a front sidewall thereof, a rear mounting plate fixedly fastened to a rear side thereof;

a locking block longitudinally slidably mounted in the receiving chamber of said casing, said locking block comprising a non-flat top sidewall, a bottom side wall, a front sidewall, a plurality of stepped through holes vertically extended through the bottom sidewall and the non-flat top sidewall, a plurality of springs respectively mounted in said stepped through holes, a plurality of headed pins respectively supported on said springs in said stepped through holes and protruding over the non-flat top sidewall, a packing plate fixedly fastened to the bottom sidewall to hold said springs and said headed pins in said stepped through holes, a fixed bolt forwardly extended from the front sidewall and moved with said locking block in and out of the front through hole of said casing;

a locating block fixedly fastened to a top side of said casing and matched with the non-flat top sidewall of said locking block, said locating block comprising a non-flat bottom sidewall fitting the non-flat top sidewall of said locking block, a top side wall, a top recess in the top sidewall, and a plurality of pinholes vertically extended through said top recess and said non-flat bottom sidewall in alignment with said stepped through holes of said locking block, said pinholes each having an expanded bottom section of diameter smaller than said stepped through holes of said locking block; and a key, said key having a plurality of bottom pins adapted for inserting into the pinholes of said locating block to disengage said headed pins from the pinholes of said locating block without engaging into the stepped through holes of said locking block.

2. The lock cylinder-free lock device as claimed in claim 1 wherein the non-flat top sidewall of said locking block has a stepped top sidewall, and the non-flat bottom sidewall of said locating block is a longitudinally grooved bottom sidewall fitting the stepped top sidewall of said locking block.

3. The lock cylinder-free lock device as claimed in claim 1 wherein the non-flat top sidewall of said locking block is curved inwards, and the non-flat bottom sidewall of said locating block is curved outwards fitting the inwardly curved top sidewall of said locking block.

4. The lock cylinder-free lock device as claimed in claim 1 wherein the stepped through holes of said locking block are arranged in two transverse rows, and the pinholes of said locating block are arranged in two transverse rows corresponding to the transverse rows of stepped through holes.

5. The lock cylinder-free lock device as claimed in claim 1 further comprising a compression spring sleeved onto the fixed bolt of said locking block and stopped between the front sidewall of said casing and an annular groove in the front sidewall of said locking block.

6. The lock cylinder-free lock device as claimed in claim 1 wherein said casing comprises a longitudinal sliding slot in one lateral side wall thereof, and a threaded finger rod inserted through said longitudinal sliding slot and threaded into a side screw hole in one lateral sidewall of said locking block for operation by hand to move said locking block in said casing.

7. The lock cylinder-free lock device as claimed in claim 1 wherein said casing further comprises a guard plate hinged to a top side of said rear mounting plate and adapted for closing said locating block.

* * * * *